United States Patent [19]
Warren et al.

[11] Patent Number: 4,951,563
[45] Date of Patent: Aug. 28, 1990

[54] FULLY AUTOMATIC CITRUS FRUIT JUICE EXTRACTOR

[76] Inventors: Loyd C. Warren, 220 Valencia Ct., Winter Garden, Fla. 32787; Donald C. Brasher, 1819 Americana Blvd., Apt. #31M, Orlando, Fla. 32809

[21] Appl. No.: 241,087

[22] Filed: Sep. 6, 1988

[51] Int. Cl.⁵ .......................... B30B 9/06; B30B 9/02
[52] U.S. Cl. .................................. 100/111; 100/127; 100/213; 100/215; 99/495; 99/507; 99/508
[58] Field of Search .................. 100/37, 39, 45, 50, 100/98 R, 104, 108, 111, 112, 127, 213, 216, 218, 215; 99/495, 507, 508, 510, 509

[56] References Cited

U.S. PATENT DOCUMENTS

| | | | |
|---|---|---|---|
| 2,264,361 | 12/1941 | Chapman | 100/213 X |
| 2,413,866 | 1/1947 | Du Laney | 100/213 |
| 2,649,730 | 8/1953 | Hait | 100/213 X |
| 2,780,988 | 2/1957 | Belk et al. | 100/108 X |
| 3,043,639 | 7/1962 | Maha | 92/169 |
| 3,086,455 | 4/1963 | Belk | 100/213 X |
| 3,236,175 | 2/1966 | Belk | 100/213 X |
| 3,269,301 | 8/1966 | Krause | 100/213 X |
| 3,608,434 | 9/1971 | Hillberry | 92/146 X |
| 3,736,865 | 6/1973 | Hait | 100/213 X |
| 4,154,163 | 5/1979 | Niemann | 100/213 X |
| 4,217,083 | 8/1980 | Machuque | 99/509 |
| 4,309,944 | 1/1982 | Frost, Jr. et al. | 100/213 X |
| 4,700,620 | 10/1987 | Cross | 100/213 X |

Primary Examiner—Philip R. Coe
Assistant Examiner—Stephen F. Gerrity
Attorney, Agent, or Firm—Julian C. Renfro

[57] ABSTRACT

An automatic juice extraction machine for squeezing juice from one or more pieces of fruit in accordance with this invention comprises at least one pair of cups disposed in a vertically aligned relationship, with the lower of each related pair of cups utilizing a series of spaced, upwardly extending fingers and a centrally disposed fruit piercing tube. This tube defines part of a passageway located directly below each lower cup, in which passageway a strainer is disposed. Each upper cup, defined by spaced, downwardly extending fingers, is mounted on a vertically movable member movable between spaced vertical positions. The spacing of the fingers allows the fingers of the upper and lower cups to mesh, to bring about squeezing of the fruit. We utilize a pneumatic device for causing a single piece of fruit to be inserted into each lower cup subsequent to the raising of the vertically movable member. Located above the strainer is a rotary valve and below the strainer is a pulp squeezing device, latter being vertically operable in the lower passageway end. The valve is movable to a passage-closed position substantially contemporaneous with the pulp squeezing device moving upward in the passageway, to compress the pulp therein. An orifice of selected size is utilized to provide a degree of inhibition to seeds and peel portions exiting downward through the passageway, thus to determine the amount of pressure existing in the pulp during the ascent of the pulp squeezing device.

20 Claims, 5 Drawing Sheets

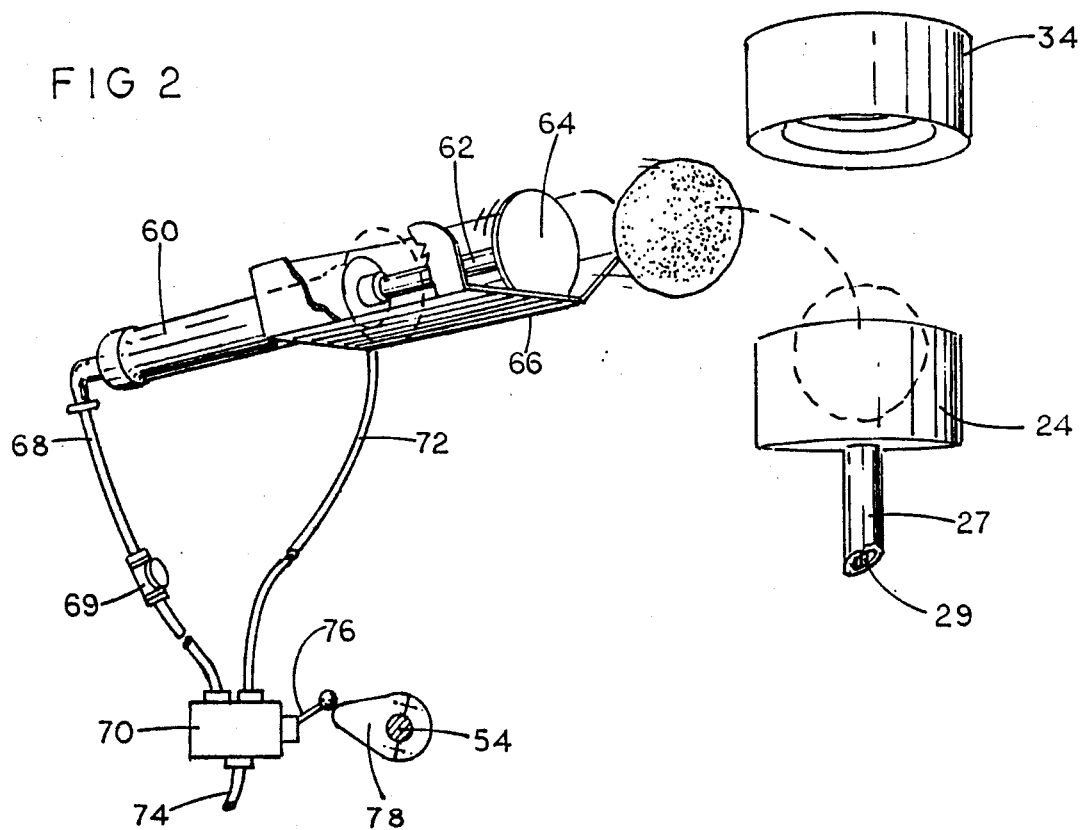
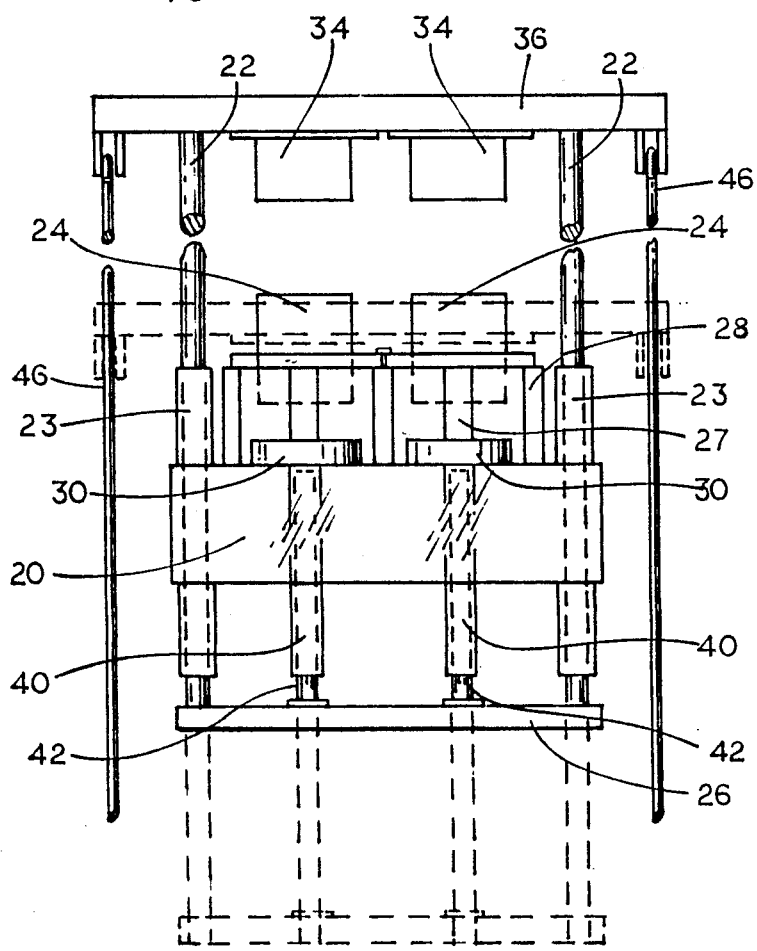

FULLY AUTOMATIC CITRUS FRUIT JUICE EXTRACTOR

BACKGROUND OF THE INVENTION

1. Field of the Invention

The present invention generally relates to apparatus for producing single strength juice from citrus fruit, in locations such as health food bars, fruit stands and the like, where the juice is to be consumed immediately. This invention is not particularly suitable as a production machine for a concentrate plant.

2. Description of the Prior Art

Juice extractors of the interdigitating cup type disclosed in the U.S. Pat. Nos. 2,780,988 to W. C. Belk et al and 2,649,730 to J. M. Hait have been used for many years to extract juice from citrus fruit. Over the years, this type of extractor has been operated at increasingly higher rates of speed and is now run at a speed of about 100 fruit per extractor cup per minute. To feed fruit to the extractor cups at such high rates, a feeding apparatus as shown and described in the U.S. Pat. No. 3,040,864 to W. C. Belk was developed.

The fruit feeding apparatus of U.S. Pat. No. 3,040,864 is designed to concurrently feed several fruit at several transversely spaced pick-up stations to the stationary lower cups of the extractor. The feeding apparatus includes a reel which is rotated synchronously with the movement of the upper cups of the extractor with finger units being attached to the reel in alignment with each pick-up station and with each finger unit having a cam follower projecting therefrom. A central camshaft having stationary cam discs thereon is provided to pivot the cam followers of the finger units. The cam discs are contoured to cause the finger units to initially engage a fruit and to thereafter elevate the fruit so that the finger unit moves at a relatively slow speed corresponding to the speed of rotation of the reel. The cam discs are further designed to cause the fingers to pivot rapidly forward after the fruit has been raised to a height where it may be thrown into the adjacent extractor cup to thereby rapidly accelerate the fruit and eject it into the cup at high velocity. This prior art feeding apparatus receives fruit from a vibratory hopper and further includes several arched bridges that extend from fruit supports at the pick-up stations adjacent the lower end of the fruit hopper to near the lower cups of the extractor. The several finger units are each attached to the reel to straddle a bridge so as to propel or slide the fruit along the bridge to the upper end of the bridge and thereafter to rapidly propel the fruit over a horizontal downstream section of the bridge into the associated lower extractor cup.

The high speed feed mechanism of U.S. Pat. No. 3,040,864 has been heretofore used only in connection with the prior art interdigitating cup extractors wherein all of the upper cups are simultaneously raised or lowered. If this type of rotary feeder were to be modified for sequential operation, a separate arrangement of a reel, several finger units and cam discs would be needed at each and every fruit feeding station. Thus, the modified feeder would be very complex and expensive to manufacture, and there would not be sufficient space between the individual feed reels to permit the discharge of fruit that failed to be picked up by the feeder.

As mentioned hereinabove, this invention is not suitable for use as a production machine in a concentrate plant, but more nearly is usable in the production of single strength juice destined to receive no additives, but rather to be consumed immediately.

SUMMARY OF THE INVENTION

A fruit juice extraction machine in accordance with this invention is particularly suitable for squeezing selected amounts of juice from one or more pieces of fruit simultaneously, typically being utilized in health food bars, retail stores, delicatessens, fruit stands and the like. It is intended to produce single strength juice to be consumed on the spot.

The machine in accordance with our invention comprises at least one pair of cups disposed in a vertically aligned relationship, each of such cups being defined by a series of spaced apart fingers. The lower of each related pair of cups is defined by a series of spaced, upwardly extending fingers and a centrally disposed fruit piercing means, and each upper cup is mounted on a vertically movable member that is movable at selected times between preascertained upper and lower positions.

Each upper cup is defined by a series of spaced, downwardly extending fingers, the fingers of each upper cup coinciding with the spaces between the fingers of the respective lower cup, such that a piece of fruit can be squeezed at the time the upper cup is caused to descend with its fingers in meshing contact with the fingers of the related lower cup.

Power means are utilized for causing the vertically movable member to undertake movement at selected times between the preascertained upper and lower positions, with the upper cup, when the vertically movable member is in the upper position, permitting the insertion of a piece of fruit into each such lower fruit receiving cup, whereas when each upper cup has been caused to move into the lowered position, it brings about the squeezing of a piece of fruit caused to reside in the respective lower cup.

In our juice extraction machine a passageway extends downwardly away from each lower cup, and down through such passageway the juice, pulp and seeds are caused to flow from the squeezed fruit. Importantly, valve means is operatively mounted in an upper portion of each passageway and this valve means is movable between open and passage-closed positions. Strainer means is located in a midportion of the passageway, below the valve means, through which strainer only the juice can flow into a surrounding juice-receiving container. Pulp squeezing means is operatively disposed in a tight fitting manner in a lower part of the passageway, and slidably movable between lowered and raised positions.

The valve means is in an open position at the time the juice is being squeezed out of the fruit as a result of the descent of the upper cup, thus to permit the juice to flow through the passageway and the strainer means into the juice-receiving container. It is important to note that the valve means is moved to a passage-closed position at a time just after the squeezing of the fruit, with the movement of the valve means to the passage-closed position being substantially contemporaneous with the pulp squeezing means being caused to ascend up through the passageway, to compress the pulp in the portion of the passageway residing adjacent the strainer means.

An orifice of selected size is located in a lower part of the passageway, to provide a degree of inhibition to the exiting of seeds and peel portions through the lowermost part of the passageway, thus to determine the amount of pressure built up in the pulp residing in the passageway during the ascent of the pulp squeezing means.

From time to time fruit having excessive amount of peel oil is being squeezed, and if the force applied by the aforementioned pulp squeezing means is not modified, this may result in an undesirable taste being imparted to the juice. Quite advantageously, we are able to control the force applied to the pulp and peel portions quite readily in accordance with this invention, by changing away from the orifice in use, to an orifice having a larger effective size, which will more readily permit the exiting of the seeds, pulp and peel portions from the passageway, and thus to some extent diminish the squeezing force being applied to the seeds, pulp and peel portions.

Ours is a multifaceted invention, and we regard as also being novel, the power means we utilize for causing a single piece of fruit to be inserted in each lower cup subsequent to the raising of the vertically movable member and the upper cup. This power means preferably takes the form of a device projecting a selected piece of fruit across a distinct air gap and into the lower cup. This power means is preferably a pneumatic actuator having a fruit-contacting portion movable between a retracted position and an extended position. We provide control means for readily enabling the operator to determine the volume of compressed air to be admitted to the actuator to cause the fruit-contacting portion to move so as to propel a piece of fruit across the air gap and into the lower cup.

Our machine is not to be confused with the juice extraction machines that run 24 hours per day, seven days per week in concentrate plants, which machines are utilized in groups of 10 to 100 machines. Each machine in a concentrate plant is constructed and equipped to extract the juice only from fruit of a very narrow range of sizes.

By way of contrast, we use a novel pneumatic fruit projection arrangement for promptly filling each lower cup of our machine in timed relation with the movements of the upper cup or cups, which fruit projection arrangement need not be changed, irrespective of a change in the size of the fruit being dealt with. We may, however, in the interests of yield, need to change from one set of upper and lower cups, to a set of upper and lower cups of a different size, so that the fingers of the cups of the new size will better conform to the size of the fruit from which juice is being extracted. This is, quite significantly, the only change we need make in our machine in order for it to operate in a highly effective manner, all the way from small oranges to large grapefruit.

It is therefore a primary object of our invention to provide a fully automatic juice extraction machine of low to modest cost, that is eminently suitable for producing single strength juice for immediate consumption, and requiring little if any maintenance and upkeep.

It is another object of our invention to provide a juice extraction machine in which the juice, seeds, pulp and peel portions evolved in the initial step of extracting juice from a piece of citrus fruit enters a vertically disposed passageway, with vertically movable pulp squeezing means disposed in the passageway being able to squeeze the juice out of the pulp to a desirable extent, so that the entry of peel oil into the juice is minimized.

It is still another object of our invention to provide a juice extraction machine in which the amount of squeeze applied to the seeds, pulp and peel portions of citrus fruit subsequent to the initial squeezing step can be carefully controlled, making our machine able to use fruit of many sizes and types, without the taste of the juice being contaminated by peel oil.

It is yet still another object of our invention to utilize one or more lower cups disposed in vertically aligned, interdigitating relationship with respective upper cups, with a novel, pneumatically operated device being utilized for projecting each new piece of fruit across a distinct air gap, and into an adjacent lower cup.

It is still another object of our invention to provide a citrus fruit juice extraction machine able to be used with a very wide range of fruit sizes, with only minimal changes, if any at all, needing to be made in the machine in order that the new fruit size can be effectively accommodated.

These and other objects, features and advantages of our juice extraction machine will be more apparent from a study of the appended drawings and description.

BRIEF DESCRIPTION OF THE DRAWINGS

FIG. 2 is a somewhat simplified view of the pneumatic fruit projecting means of the type preferred for loading fruit, one piece at a time, into each lower cup of our juice extraction machine, immediately prior to the descent of the respective upper cup;

FIG. 3 is a somewhat simplified showing of the upper and lower bar members that move down together to accomplish the initial squeezing of the fruit, followed by the ascent of these members, during which time pulp squeezing means on the lower bar member accomplish a desirable amount of squeeze upon the seeds, pulp and peel portions evolved during the initial squeezing of the fruit, with peel oil in the juice being largely avoided;

DETAILED DESCRIPTION

Figure 1:
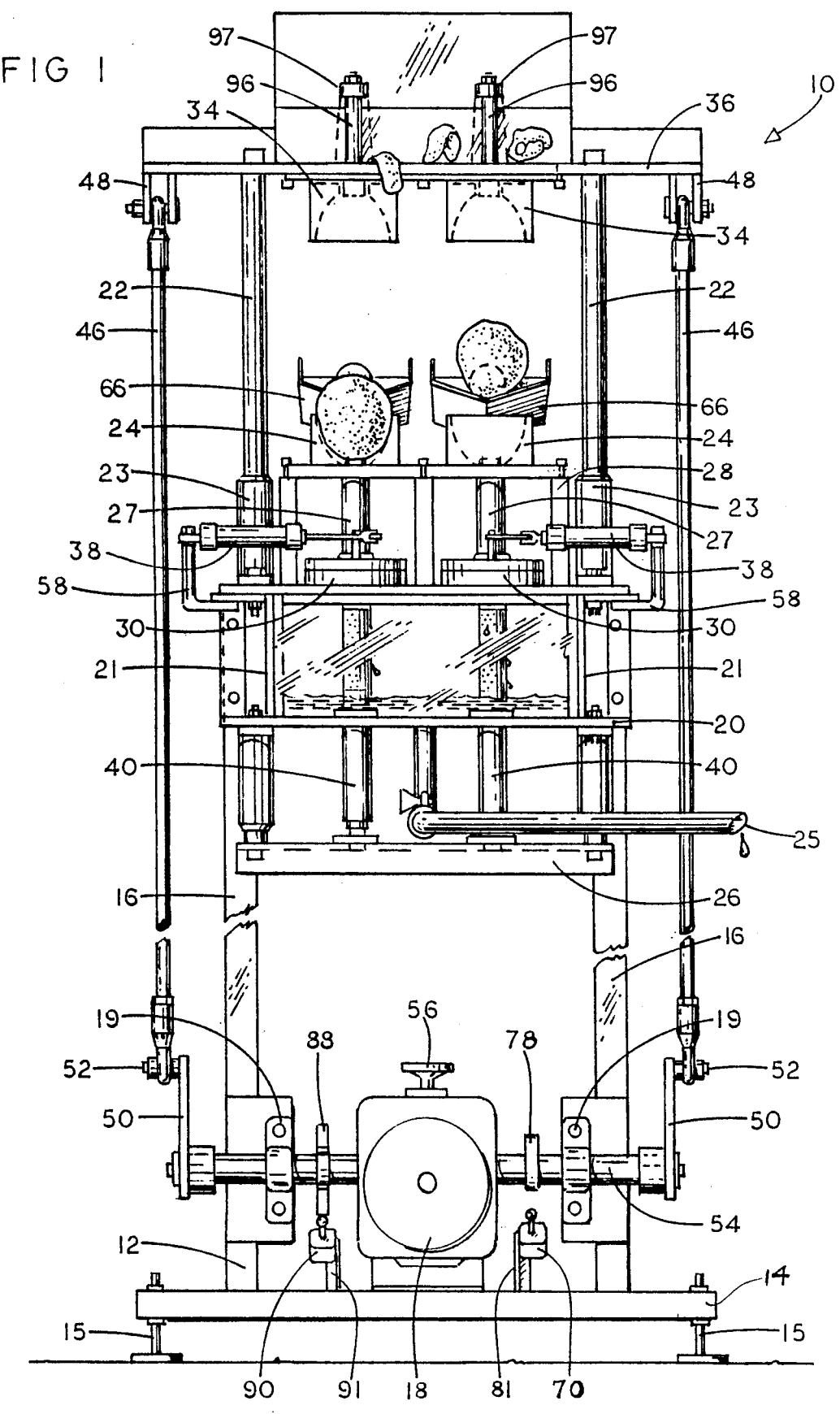
FIG. 1 is a side elevational view of our fully automatic juice extraction machine, in this instance using two lower fruit-receiving cups made up of spaced fingers, which fingers can mesh with the spaced fingers of upper cups disposed in aligned relation with the lower cups, thus to bring about squeezing of the fruit residing in the lower cups, with means also being provided on our machine for squeezing a selected amount of juice out of the pulp evolved during the initial squeezing of the fruit.

With initial reference to FIG. 1, it will be seen that we have depicted a preferred embodiment of our novel juice extractor 10, involving a structural frame 12. The mounting base portion 14 of the frame 12 serves as a firm support for the vertical frame members 16, and for the drive motor 18.

The frame members 16 serve to support the manifold 20 in a non-moving position as viewed in FIG. 1, with the manifold being what may be regarded as a three-sided stainless steel box. The manifold 20 serves as a juice receiving receptacle of sturdy construction, with its open side being toward the viewer in FIG. 1. The front of the manifold is preferably closed by a transparent rigid plastic sheet, such as of LEXAN.

The use of the transparent panel is quite desirable, for our machine is typically used in a health food bar, retail store, fruit stand, delicatessen or the like, and it has been found that the sale of citrus fruit juice is considerably increased when patrons are able to see the interesting and highly effective way in which our apparatus goes about squeezing the citrus fruit inserted into the machine.

The end panels 21 of this stainless steel box 20 have been placed several inches inward from the outside edges. The manifold 20 is placed to receive the juice squeezed from the citrus fruit, so the end panels 21 are placed so that the vertically disposed main shafts 22, which pass through the manifold 20, are not contained within the juice receiving area. The vertically disposed main shafts 22 are mounted to move up and down within respective shaft guides 23, such guides being affixed to the outer portions of the manifold.

Supported upon the manifold 20 are a number of components closely associated with squeezing the juice out of the citrus fruit caused to be placed in a pair of stationary bottom cups 24. The bottom or lower cups are mounted upon three sturdy support pedestals 28, with the middle pedestal serving to support the inner edge of both of the lower cups. It is to be realized that each bottom or lower cup 24 is made up of a series of spaced apart, upwardly-extending fingers.

Centrally located in the lower cup is a fruit piercing member or knife, preferably of tubular construction, having sharpened upper edges. We prefer for the skin of the fruit to be pierced by the lower fruit piercing knife shortly after the respective upper fingers have contacted the upper or top portion of the orange, grapefruit, or other citrus fruit being squeezed.

Figure 7:
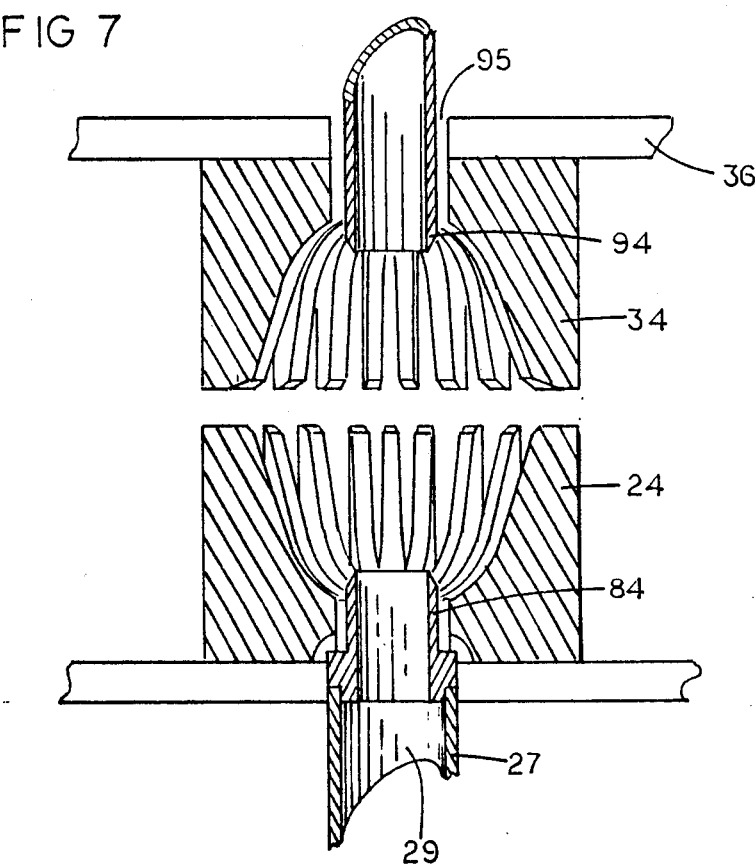
FIG. 7 is a cutaway view revealing the precisely spaced fingers of the carefully aligned upper and lower cups, as well as the fruit piercing tubes utilized in the cups.

We usually also use an upper fruit piercing knife, as illustrated in FIG. 7, and we prefer for the lower fruit piercing knife to penetrate the fruit prior to the penetration of the fruit by the upper fruit piercing knife.

Apparatus shortly to be described in connection with FIG. 2 is responsible for loading the fruit to be squeezed into the cups 24, one piece at a time.

Continuing with FIG. 1, it is to be seen that a pair of top or upper cups 34 are supported on the underside of the top bar 36, which top bar is supported by the pair of vertically-disposed main shafts 22 which, as previously mentioned, are movable vertically in the shaft guides 23. The top bar will from time to time be regarded as a generally horizontally disposed vertically movable member.

Mounted a fixed distance away from the top bar 36 is bottom bar 26, with it being understood that the bars 26 and 36 are held in fixed relation by the main shafts 22, and arranged to move together at all times during the fruit squeezing procedure. By way of example, the upper and lower ends of the main shafts may be threaded, and nuts screwed onto the threads, so as to hold the upper and lower bars at a constant distance.

The arrangement involving the upper and lower bars being held together, such that they move relatedly at all times is to be contrasted with the relationship of bar movements having to be determined by a fairly complex cam action, as was necessary in accordance with the teachings of the prior art.

The top bar 36 is caused to move downwardly each time a pair of oranges, grapefruit or other citrus resting in the bottom cups 24 is to be squeezed. The top cups 34 reside in careful alignment with the bottom cups, with each top cup made up of a series of downwardly extending, spaced apart fingers. The relationship of fingers of each of the two aligned pairs of cups is such as to permit the upper fingers to move past the respective lower fingers, with their interdigitation thus bringing about a highly effective squeezing action on citrus fruit. The arrangement is such that juice, pulp and seeds squeezed out of each piece of fruit flows downwardly along a generally vertical passageway in a manner to be described shortly, and eventually into the manifold 20. From the manifold the juice thereafter flows out through the manifold drain tube 25, visible in FIG. 1.

Because each of the fingers of the lower cup is in careful alignment with the spaces between the respective upper fingers, and vice versa, the two sets of fingers of each pair of interacting cups can readily mesh or interdigitate as the upper fingers descend, thus explaining how the fruit is squeezed. The top and bottom cups defined by these spaced fingers do not per se represent any significant part of our invention.

Before further considering the squeezing action brought about by the top and bottom cups, it should be pointed out that the top bar 36 is caused to move up and down to effect the squeezing action by means of a pair of elongate connecting rods 46. A suitable rod end bearing is utilized at the upper end and the lower end of each connecting rod 46, with the upper rod end bearings being attached to respective connecting rod clevis members 48 mounted at each end of the underside of the top bar 36.

At the lower ends of the connecting rods 46, the rod end bearings are rotatably attached to pins 52 mounted upon respective bell cranks 50. The bell cranks 50 are affixed in carefully aligned relationship with each other on rotatable drive shaft 54 that is driven in rotation at a suitable speed by the drive motor 18. We prefer to use a variable speed gearmotor of three horsepower, whose output may be varied between 14 and 68 rpm.

A rotatable speed adjustment wheel 56 is located atop the drive motor 18, and it is worthwhile to note that speed of operation of our machine can readily be changed by an operator having no particular skill in working with machines. This change of speed is brought about by making available a speed adjustment wheel 56 on top of the drive motor 18. The operator sensing that he or she has on hand an extensive buildup of freshly squeezed juice can rotate the speed adjustment wheel so as to decrease the speed of the machine and therefore diminish the rate at which juice is being squeezed.

On the other hand, if the operator senses that the supply of fresh juice on hand is getting low, he or she can rotate the speed adjustment wheel so as to increase the speed of operation of the machine, and thus produce juice at a higher rate.

Although we have shown and described electric motor means for squeezing the juice, because of the readiness by which speed can be controlled, it is entirely within the spirit of our invention to utilize other means, such as may involve hydraulics, pneumatics or the like.

Returning to FIG. 1, it is to be realized that the bell cranks 50 may each be 5.75 inches long, with the motion of the bell cranks causing the top bar 36 as well as the bottom bar 26 to move consistently up and down over an excursion of 11.5 inches. Obviously we are not to be limited to this. Such an excursion of course brings about the raising and lowering of the top cups 34 in their meshing relationship to the bottom cups 24 in a consistent and preascertained manner, so as to systematically squeeze the juice out of each new piece of fruit inserted into the bottom cups. The movement of the top cups may be regarded as being in carefully timed relationship to the fruit insertion device described in conjunction with FIG. 2.

As previously indicated, the bottom cups 24 are mounted on a bottom cup pedestal 28 and do not move during any phase of the operation, or in other words, the pedestal 28 may be regarded as a relatively immovable support means. In the central interior portion of each cup 24 is a bottom knife tube, shown to some extent in FIG. 1, but shown in clearer detail in FIG. 7. The sharp, circular upper edges of the bottom knife tube 84 extend up a bit in the center of the bottom of each lower cup 24, and the sharp circular edges of the upper knife tube 94 are responsible for piercing the skin of the fruit on opposite sides of the fruit at the time of the squeezing action brought about by the descent of the top cups 34.

Each bottom knife tube is mounted inside its respective bottom knife support tube 27, with such support tubes serving as vertically disposed passageways 29 through which the juice, pulp, seeds and peel portions can flow immediately after the interdigitating cups have squeezed the piece of fruit disposed on each bottom cup. Both of the tubes 27 are visible in FIG. 1, but in clearer detail in FIG. 7.

Directly below each knife support tube 27 is a disc valve assembly 30, discussed at length hereinafter. A pneumatic actuator 38 is operatively associated with each disc valve assembly, to control in a carefully timed manner, the positioning of the disc valve that is rotatably mounted in the interior of each disc valve assembly. Each pneumatic actuator is supported by a respective support arm 58, visible in FIG. 1. The preferred form of disc valve is not shown in FIG. 1, but is to be seen at 32 in FIG. 4.

Figure 4:
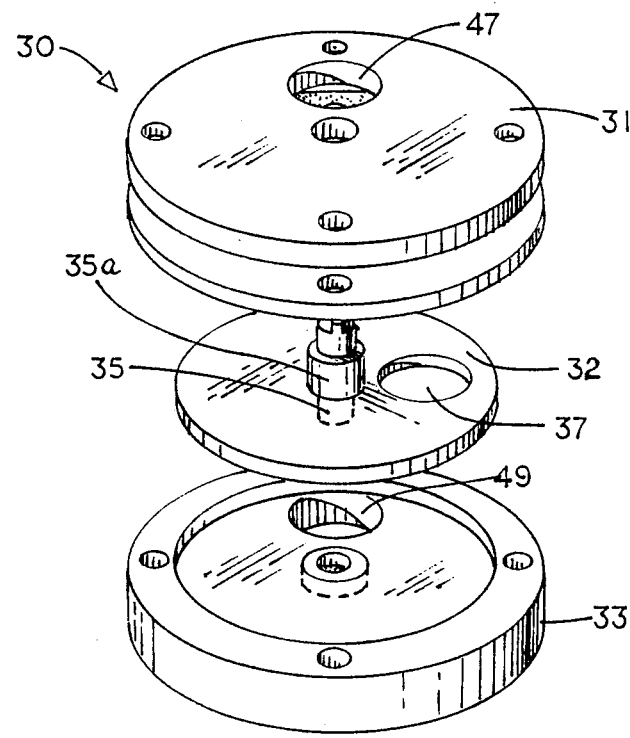
FIG. 4 is an exploded view of the disc valve assembly, to reveal internal construction.

In FIG. 4 it will be seen from this exploded view of the disc valve assembly 30 that we have provided a rotatable valve member 32, which is mounted on a shaft 35 that is rotatably mounted in top plate 31 and bottom plate 33. The rotatable valve member 32 is tightly affixed to shaft 35.

The rotatable valve member 32 has an orifice 37 movable into and out of aligned relationship with the orifice or aperture 47 in top plate 31, and the aperture 49 in bottom plate 33. The orifices or apertures 47 and 49 remain in an aligned relationship at all times.

Figure 4A:
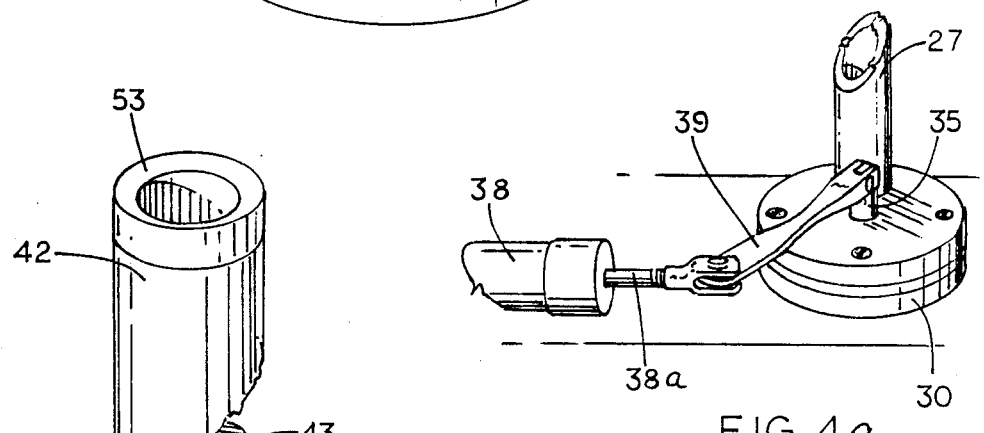
FIG. 4a is a fragmentary perspective view, revealing the operational disc valve assembly, and a portion of the actuator utilized for moving the rotary disc valve member to the passage closing position in the precisely correct relationship to the ascent of the pulp squeezing means.

In FIG. 4a we show the arrangement by which the rotary disc valve member 32 is caused to rotate between passage-open and passage-closed positions. An arm 39 is tightly bolted to the upper end of the shaft 35, with the other end of the arm 39 being affixed to the end of shaft 38a of actuator 38, preferably a pneumatic actuator. The manner and times when the actuator is caused to extend will be explained shortly.

As is obvious, suitable bolts equipped with nuts (not shown) are utilized for securing the top plate 31 and bottom plate 33 in the assembled relation shown in FIG. 4a, with a gasket preferably being used on the underside of top plate 31 that comes into contact with the raised peripheral edge of the bottom plate 33 when these several members are bolted together in assembled relation. A collar 35a is utilized on the shaft 35 to maintain the rotary disc valve member 32 in the appropriate relationship to the members 31 and 33 when these several components have been assembled together.

Figure 8A:
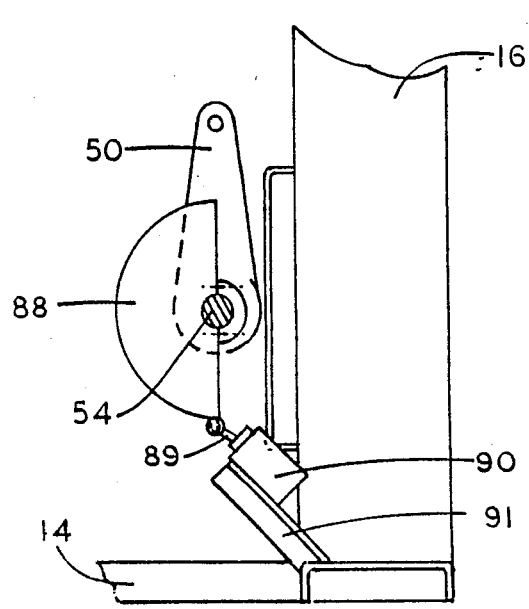
FIG. 8a is an idealized view of the 180 degree cam arrangement used in concert with the pneumatically operated rotary valve, which valve is held in the open position during the initial squeezing of a piece of fruit, and subsequently held in the closed position during the ascent of the pulp squeezing means.

Best seen in FIG. 8a is the cam arrangement responsible for holding the rotary disc valve member 32 in the closed position the entire time that the top and bottom bars are ascending. This involves the use of a circular type of cam 88 mounted on the shaft 54, which cam has an extent of 180 degrees.

In contact with the significant part of the cam 88 is cam follower 89 that is attached to a three way valve 90. One three way pneumatic valve 90 is responsible for supplying compressed air in a properly timed and precisely correct relationship to the respective ends of both of the pneumatic actuators 38 that control the positioning of the pair of rotary valve members 32. The valve 90 is supported by a suitable bracket 91.

For convenience we install a "T" fitting in each line from the three way valve 90, such that both actuators 38 partake of the compressed air at the same time, in both the extension stroke of each actuator, as well as in the retraction stroke.

Inasmuch as the components on the left side of our machine are virtually identical to the components utilized on the right side of our machine, it is not believed to be necessary to discuss all of the components in duplicate. For this reason, only single components will be described in FIGS. 2, 4 and 5, in FIGS. 6a, 6b and 6c, and in FIGS. 7 and 8a, 8b.

Figure 5:
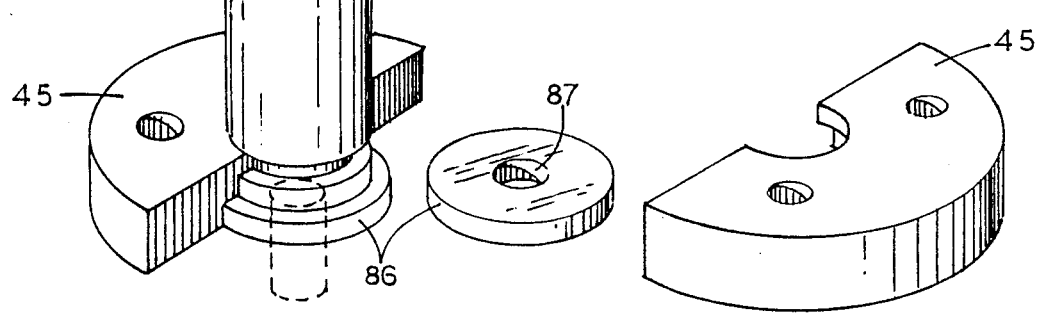
FIG. 5 is a perspective view of a typical squeeze tube in accordance with this invention, with portions broken away to reveal internal construction.

With reference now to FIG. 5, we have there shown a typical squeeze tube 42, made up of a stainless steel interior member 43, and a surrounding member 44 of tough plastic having excellent wear resistance. For example, the tube 44 may be of P.E.T. plastic (Ertalyte), selected for its wear tolerance. The members 43 and 44 are tightly secured together, and are replaceable as a unit if such ever becomes necessary. The uppermost circular, generally funnel shaped upper end 53 of the squeeze tube is part of the stainless steel member 43, and portion 53 comes in direct contact with the seeds, pulp and peel portions during the pulp squeezing cycle.

It is to be understood that each pair of joined tubes 43 and 44 is maintained in the upright position on the bottom bar 26 as a squeeze tube 42; note FIG. 3. It is through the passageway in the center of stainless steel tube 43 that the pulp, seeds and peel portions forcefully exit during the fruit squeezing cycle; note FIGS. 6b and 6c.

As visible in FIG. 3, each of the pair of squeeze tubes 42 is mounted on the bottom bar 26 by the use of a split retainer 45, made up of two identical halves; note FIG. 5. As will be seen, two bolt holes are preferably utilized in each half, with four bolts therefore being utilized for securing each of the squeeze tubes 42 to the bottom bar.

Each half of the split retainer 45 has a circular recess cut in its underside so as to receive an orifice member 86, in the central interior portion of which is an orifice 87 of selected size. This orifice controls the amount of pressure exerted upon the pulp of the citrus fruit residing in the generally vertical passageway 29 immediately after the squeezing of the fruit by the interdigitating cup fingers. This pressure exerted on the pulp is brought about by pulp squeezing means, described hereinafter.

It is highly advantageous for us to be able to substitute a different orifice member 86 in the event an orifice 87 of a larger size or a smaller size is desired; note the orifice member depicted in FIG. 5. As a generality, the use of a smaller orifice brings about the application of a harder squeeze on the pulp contained in the passageway 29, and the liberation of more juice, but when the peel has a high peel oil content, it is desirable to use a larger orifice, so a lesser squeeze would be applied to the juice, seeds, pulp and peel contained in the passageway. The orifice member 86 may be cut out of one-eighth inch thick flexible plastic wear surface, such as TEFLON, To change orifices, it is only necessary to remove the bolts from one of the retainer ring halves 45, slide out the orifice member 86 that has been in use, and replace it with the selected orifice member of a new hole size. This ready change of orifice size in accordance with this invention greatly simplifies the manner we go about squeezing selected amounts of juice out of the pulp evolved by the initial squeezing operation. A more complete explanation of the function of the orifice member and its central orifice 87 will become apparent shortly.

Figure 6A:
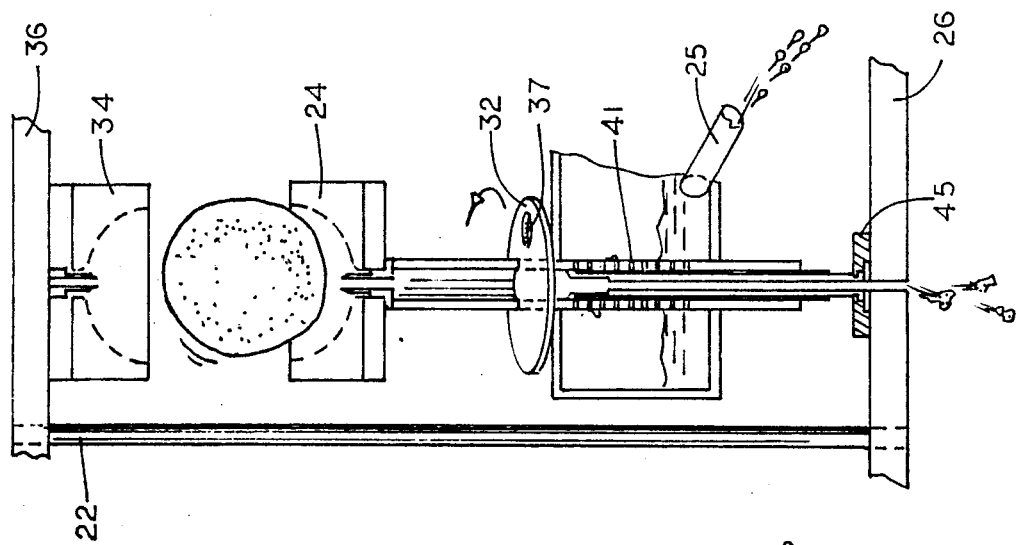
FIGS. 6a, 6b and 6c are related views, revealing the rotary disc valve 32 in the open position during the initial squeezing of the fruit; the movement of this valve to the closed position during the ascent of the pulp squeezing means; and the receipt of a new piece of fruit in a lower cup preparatory to another squeeze cycle.
Figure 6B:
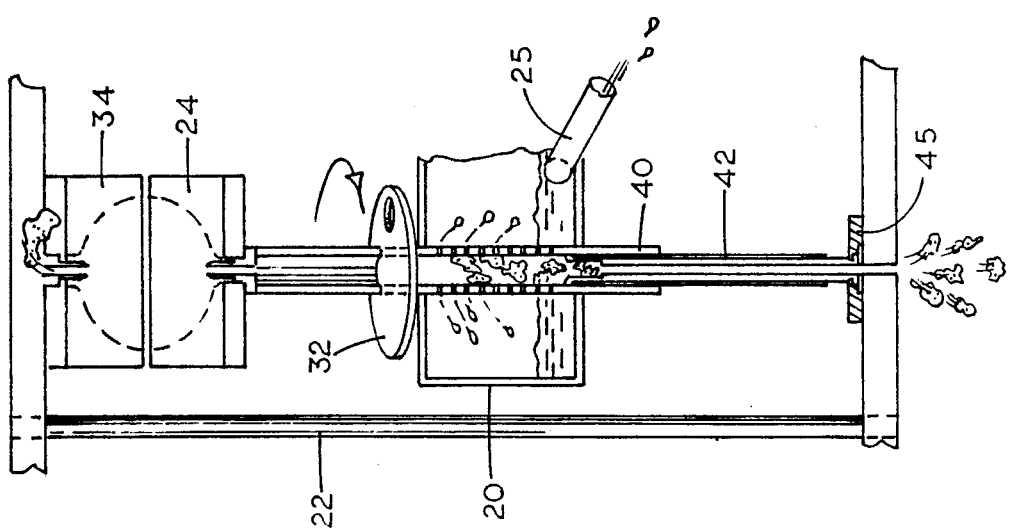
Figure 6C:
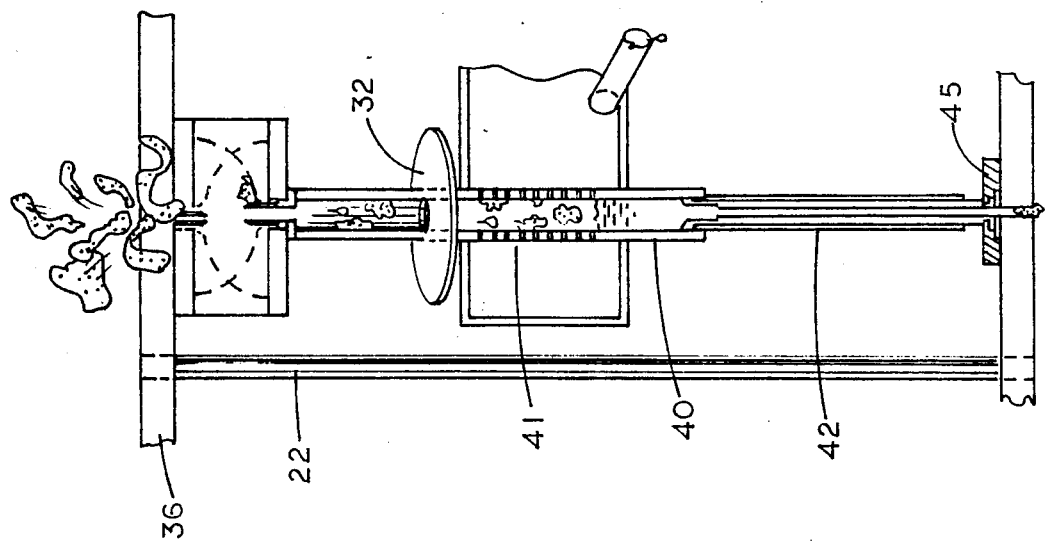

As best seen in related FIGS. 6a, 6b and 6c, and as will be discussed in some detail hereinafter, located directly below each bottom cup 24 is a perforated tube portion 41, which portion is part of juice tube 40, which is non movable. The perforated tube portion 41 is entirely contained within the manifold 20, and this perforated tube portion may be regarded as a strainer means. It is through this perforated portion 41 that the juice squeezed from the fruit flows into the manifold 20; note FIG. 6b in particular.

Clearly visible in FIGS. 1 and 3 is the pair of juice tubes 40, which tubes remain in a fixed relation to the stationary manifold 20 at all times. In FIG. 3, which will soon be discussed in greater detail, we depict certain of the components isolated from the others, with the top bar 36 being shown in its fully raised position by the use of full lines, and its fully lowered position by the use of dashed lines. Partially visible in FIG. 3 is the pair of squeeze tubes 42 or pulp squeezing means, that are caused to move up inside their respective juice tubes 40 in a tightly fitting relationship at the time the bottom bar 26 ascends, this of course causing juice to be extruded through the perforated tube portions or strainer means 41. The interaction of the squeeze tubes 42, the pulp squeezing means, with the disc valves 32 located in the disc valve assemblies 30 above the perforated tube portions when fruit pulp is in the passageway is one of the most significant aspects of our invention.

At the time the rotation of the bell cranks 50 causes the top bar 36 to descend, the spaced fingers of each top cup squeeze the pair of oranges or grapefruits resting in the respective bottom cups, with the fingers actually involved in these cups being depicted in FIG. 7. Also visible in FIG. 7 is the space 95 around the upper knife tube 94 located in the center of the upper cup 34. It is through the space 95 that the bulk of the peel is extruded during the procedure in which the interdigitating fingers of the upper and lower cups tightly and forcefully squeeze the inserted piece of fruit; note FIGS. 1 and 6a.

Each upper knife tube 94 is held in the correct operative position by a positioning shaft 96, which in turn is supported in the correctly aligned, non moving position by a respective finger or bracket 97.

At the time of the descent of the top bar (and bottom bar), both of the disc valves 32, located in the respective disc valve assemblies 30, are positioned by their respective pneumatic cylinders 38 in the open position. The subsequent closure of the disc valves 32 during each cycle will shortly be discussed.

In FIG. 2 we reveal the components responsible for delivering the fruit across an air gap of approximately seven inches, to the respective bottom cup 24.

In this figure, pneumatic cylinder 60 has a piston (not shown) that is selectively movable therein, with a rod 62 being connected to the piston. Connected to the outer end of the rod 62 is a feed disc 64, disposed just below which is a feed trough 66. The feed trough has a central crease, into which is placed a succession of single pieces of fruit, to be projected across the air gap to the adjacent bottom cup 24 in timed relation to the operation of the top bar 36.

By movements of the piston, under the influence of compressed air, the feed disc 64 is movable between the retracted position (shown in dashed lines in FIG. 2), and the extended position (shown in full lines). The action of the feed disc 64 in the fruit projecting direction is very sudden and forceful, and most significantly, no change in the fruit projecting mechanism need be made when going from one size fruit to another, or when going from oranges to grapefruit, or vice versa. As previously mentioned, however, we may find it desirable to change cups, from one set of matched upper and lower fingers, to another set of matched upper and lower fingers, at such time as a very distinct change is being made in fruit size being dealt with. Such change in the cups used is made only in the interests of yield, and no change need be made in the fruit projecting mechanism, or in any other portion of the machine.

Connected adjacent the rear end of the pneumatic cylinder 60 is an air supply line 68, hereinafter referred to as the extension air supply line, with the opposite end of the line 68 being connected to three way pneumatic valve 70. Speed control valve 69 is disposed in the air supply line 68.

Also connected to the three way pneumatic valve is retraction air supply line 72, the opposite end of which is connected adjacent the front end of the pneumatic cylinder 60.

Connected to the three way pneumatic valve is a compressed air supply line 74, this hereinafter being referred to as the source of compressed air. We prefer to supply air under a pressure of 100 pounds per square inch to the valve 70, although we are not to be limited to this pressure.

One valve 70 serves both pneumatic actuators 60, and to this end we place a "T" fitting in the line 68 between the valve 70 and the speed control 69. Each pneumatic actuator for projecting the fruit into the lower cup is equipped with its individual speed control 69. Once properly set, we find we seldom need to adjust either of the speed control valves.

Figure 8B:
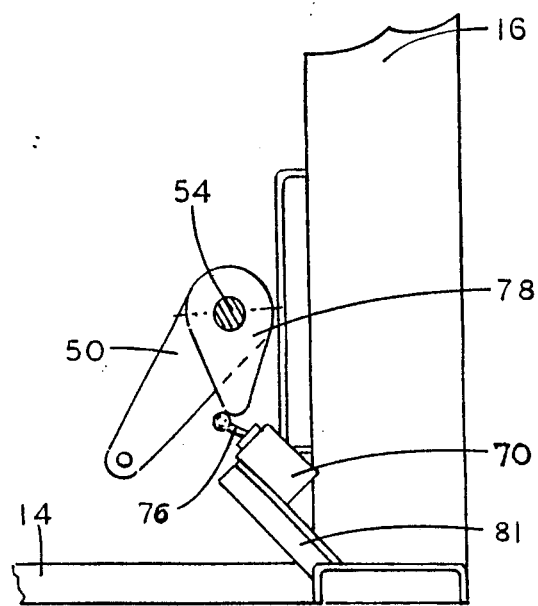
FIG. 8b is an idealized view of the cam arrangement used in connection with the operation of the pneumatic actuator utilized for projecting each piece of fruit across a distinct air gap, into the adjacent lower cup.

The operating lever 76 of the three way valve 70 is disposed adjacent the rotary cam 78, this cam being mounted on the rotatable drive shaft 54, and thus being driven by the motor 18 at the same speed as the shaft 54; note FIGS. 2 and 8b. A typical speed for the shaft 54 is 50 revolutions per minute, but as previously made clear, the speed of rotation of the shaft is under control of the operator.

Movements of the lever 76 between alternate operating positions by the rotating finger-shaped cam 78 is responsible for causing compressed air to be delivered in proper sequence to alternate ends of the pneumatic actuator 60, in order to bring about the actions of the feed disc 64 that are responsible for projecting the pieces of fruit across the air gap to the cup 24.

The air displaced from the forward end of the pneumatic cylinder at the time of movement of the feed disc from the retracted position to the extended position is through the line 72, back through the valve 70, where it is released to the atmosphere. Similarly, the air displaced from the rearward end of the pneumatic cylinder during return of the feed disc to the retracted position is through the line 68, back through the valve 70. This type of operation is typical of the operation of a three way valve, and is well known in the art.

By use of the speed control valve 69, which preferably is a needle valve, the operator can control the volume of air entering the rear end of the cylinder of the actuator 60, thus enabling him or her to control the distance the fruit is projected across the air space into the lower cup by the forcefully moving disc 64.

In FIG. 3 we depict certain of the components isolated from the others, as previously mentioned, with the top bar 36 being shown in its fully raised position by the use of full lines, and its fully lowered position by the use of dashed lines. Similarly, in FIG. 3 we also show the bottom bar 26 in its fully raised position by the use of full lines, and the bottom bar in its fully lowered position by the use of dashed lines.

As mentioned above, as the top bar 36 descends, both of the valve discs 32 of the type shown in FIG. 4 are in the open position so that a passage from the bottom cup is open for pulp and juice to flow downward into the pair of perforate tubes. The juice evolving from the citrus fruit then flows outwardly from the numerous holes of the perforate tube portions 41, into the manifold 20.

At such time as the top bar 36 has reached its lowest position, both of the rotary disc valves 32 are caused to be closed by the action of their respective pneumatic cylinders 38. With the top bar and bottom bar then both ascending, the squeeze tubes 42 attached to the bottom bar 26 are caused to move upwardly through the interior of their respective perforate tubes in a closely fitted relationship, squeezing the juice out of the pulp with considerable force. The juice is caught in the manifold 20 from which it then flows out through above-mentioned manifold drain tube 25, visible in FIG. 1. The pulp remnants, the seeds, and the peel portions pass downwardly through the squeeze tubes 42, as depicted in FIGS. 6b and 6c, where they are discarded into appropriate collection bins (not shown). This material makes good cattle feed.

A significant part of the present invention is involved in the use of the previously mentioned TEFLON member 86 whose orifice 87 is of appropriate size. The teflon orifice members 86 kept on hand should represent a wide selection of carefully sized center holes or orifices 87, the precise size hole or aperture to be used in a given instance depending upon the size and the nature of the fruit being squeezed. It is quite significant to realize that our machine is readily usable with a wide range of fruit sizes, such as from diameters of two inches up to diameters of six inches.

As previously mentioned, we may, in the interests of yield, prefer to be able to switch in a machine of the type depicted in FIG. 1, from left and right pairs of upper and lower cups of one size, to left and right pairs of upper and lower cups of another size, when moving from one size fruit, to fruit of a distinctly different size.

It has also been mentioned that as the juice is squeezed out through the perforated tube portion 41, the pulp remnants, seeds and peel portions move downwardly through the squeeze tubes 42 to be discarded, with the size of the orifice 87 of the member 86 being sized to make it easy or difficult for the passage of pulp and seeds. On the one hand, it is desirable for the orifice to be of small size, for the smaller the orifice, the more difficult it is for pulp a nd seeds to pass therethrough, which therefore brings about a very thorough squeezing action on the pulp extruded from the fruit.

On the other hand, some oranges have peels that tend to give off a strong peel oil which, in many instances, is quite undesirable. Therefore, when squeezing oranges of a type tending to give off peel oil, it is desirable to make the squeezing action less strong, such that the amount of peel oil evolved is minimized. This diminishment of the squeezing action can be readily effected by utilizing an orifice member having an orifice that is of comparatively large size.

With regard to the placement of pieces of fruit, one at a time, on the feed troughs 66 immediately prior to the energizing of the respective pneumatic actuators 60, such can be readily accomplished in accordance with a number of different prior art techniques. Some of these techniques involve electrically operated lifting devices, and some involve gravity, and we attach no invention thereto.

By the operator being able to readily change the orifice size merely by removing two or the bolts holding the split squeeze tube retainer ring 45, the amount of squeeze applied to the fruit can be readily controlled. This is an important aspect of our invention, for known prior art machines are much more difficult to control insofar as the application of an appropriate amount of squeeze pressure is concerned. In other words, if it became desirable to change the amount of squeeze to reflect the type of oranges being juiced, the known prior art machines could not be as quickly adjusted as is readily possible in accordance with this invention.

We claim:

1. A fruit juice extraction machine for squeezing selected amounts of juice from at least one fruit item, said machine comprising at least one pair of cups disposed in a vertically aligned relationship, each of said cups being defined by a series of spaced apart fingers, with the lower of each related pair of cups being defined by a series of spaced, upwardly extending fingers and a centrally disposed fruit piercing means, each upper cup being mounted on a vertically movable member that is movable at selected times between preascertained upper and lower positions, each upper cup being defined by a series of spaced, downwardly extending fingers, the fingers of each said upper cup coinciding with the spaces between the fingers of the respective lower cup, such that an item of fruit received in said lower cup can be squeezed as a consequence of the upper cup descending with its fingers in meshing contact with the fingers of the related lower cup, power means for causing said vertically movable member to undertake recurring movements between the preascertained upper and lower positions, with said upper cup, when said vertically movable member i in said upper position, permitting the insertion of an item of fruit into each said lower fruit receiving cup, and when each said upper cup has been caused to move into the lowered position, it brings about the squeezing of the fruit item caused to reside in the respective lower cup, a passageway extending downwardly away from each said lower cup, through which juice, pulp and seeds are caused to flow from the squeezed fruit as a result of the descent of said upper cup, valve means operatively mounted in an upper portion of said passageway and movable between open and passage-closed positions, strainer means located in a mid part of said passageway, through which only the juice can flow into a surrounding juice-receiving container, pulp squeezing means operatively disposed in a tight fitting manner in a lower part of said passageway, and slidably movable between lowered and raised positions, said valve means being in an open position at the time the juice is being squeezed out of the fruit as a result of the descent of said upper cup, to permit the juice to flow through said passageway and said strainer means into the juice-receiving container, said valve means being moved to a passage-closed position at a time subsequent to the squeezing of the fruit by said upper cup, the movement of said valve means to said passage-closed position being substantially contemporaneous with said pulp squeezing means being caused, in concert with the upward movement of said upper cup, to ascend up through said passageway, to compress the pulp in said passageway residing adjacent said strainer means, and an orifice of selected size located in a lower part of said passageway, to provide a degree of inhibition to the exiting of seeds through the lowermost part of said passageway, thus to determine the amount of pressure built up in the pulp residing in said passageway during the ascent of said pulp squeezing means.

2. The juice extraction machine as defined in claim 1 in which second power means are utilized for causing a single piece of fruit to be inserted in each lower cup subsequent to the return of said vertically movable member to its raised position, said second power means taking the form of a device projecting a selected piece of fruit across a distinct air gap and into said lower cup.

3. The juice extraction machine as defined in claim 2 in which said second power means is a pneumatic actuator having a fruit-contacting means movable between retracted and extended positions, said pneumatic actuator serving to cause said fruit-contacting means to project the fruit across the air gap after said vertically movable member and upper cup have raised, and before the next descent of said vertically movable member.

4. A fruit juice extraction machine for squeezing selected amounts of juice from at least one fruit item, said machine comprising at least one pair of cups disposed in a vertically aligned relationship, each of said cups being defined by a series of spaced apart fingers, with the lower of each related pair of cups being defined by a series of spaced, upwardly extending fingers and a centrally disposed fruit piercing means, each upper cup being mounted on a vertically movable member that is movable at selected times between preascertained upper and lower positions, each upper cup being defined by a series of spaced, downwardly extending fingers, the fingers of each said upper cup coinciding with the spaces between the fingers of the respective lower cup, such that an item of fruit received in said lower cup can be squeezed as a consequence of the upper cup descending with its fingers in meshing contact with the fingers of the related lower cup, power means for causing said vertically movable member to undertake recurring movements between the preascertained upper and lower positions, with said upper cup, when said vertically movable member is in said upper position, permitting the insertion of an item of fruit into each said lower fruit receiving cup, and when each said upper cup has been caused to move into the lowered position, it brings about the squeezing of the fruit item caused to reside in the respective lower cup, a passageway extending downwardly away from each said lower cup, through which juice, pulp and seeds are caused to flow from the squeezed fruit as a result of the descent of said upper cup, and through the lowermost part of which the seeds can finally exit, valve means operatively mounted in an upper portion of said passageway and movable between open and passage-closed positions, strainer means located in a mid part of said passageway, through which only the juice can flow into a surrounding juice-receiving container, pulp squeezing means operatively disposed in a tight fitting manner in a lower part of said passageway, and slidably movable between lowered and raised positions, said valve means being in an open position at the time the juice is being squeezed out of the fruit as a result of the descent of said upper cup, to permit the juice to flow through said passageway and said strainer means into the juice-receiving container, said valve means being moved to a passage-closed position at a time subsequent to the squeezing of the fruit by said upper cup, the movement of said valve means to said passage-closed position being substantially contemporaneous with said pulp squeezing means being caused to ascend up through said passageway, to compress the pulp in said passageway resign adjacent said strainer means, and an orifice of selected size located in a lower part of said passageway, to provide a degree of inhibition to the exiting of seeds through the lowermost part of said passageway, thus to determine the amount of pressure built up in the pulp residing in said passageway during the ascent of said pulp squeezing means, said orifice being part of an orifice member contained in an orifice retention device, said orifice retention device being readily opened to permit one orifice member to be exchanged for an orifice member having a different effective diameter.

5. A fruit juice extraction machine for squeezing selected amounts of juice from at least one fruit item, said machine comprising at least open lower fruit receiving cup mounted upon a relatively immovable support means, each lower cup being defined by a series of spaced, upwardly extending fingers and a centrally disposed fruit piercing means, at least one upper cup mounted upon a generally horizontally disposed, vertically movable upper bar, with each upper cup being in vertical alignment with a respective lower cup, each upper cup having a series of spaced, downwardly extending fingers, the fingers of each said upper cup coinciding with the spaces between the fingers of each said lower cup, such that an item of fruit can be squeezed as a consequence of said upper cup descending with its fingers in meshing contact with the fingers of the respective lower cup, power means for causing said vertically movable upper bar to undertake recurring movements between preascertained raised and lowered positions, with said upper cup, when said upper bar is in said raised position, permitting the insertion of an item of fruit into each said lower fruit receiving cup, whereas when each said upper cup has been caused to move into the lowered position, it brings about the squeezing of an item of fruit caused to reside in the respective lower cup, a passageway extending downwardly away from each said lower cup, through which juice, pulp and seeds are caused to flow from the squeezed fruit, and through the lowermost part of which the seeds can finally exit, valve means operatively mounted in an upper portion of said passageway and movable between open and passage-closed positions, strainer means located in a mid part of said passageway, through which only the juice can flow into a surrounding juice-receiving container, pulp squeezing means operatively disposed in a tight fitting member in a lower part of said passageway, and slidably movable between lowered and raised positions in concert with downward and upward movements of said upper cup, said valve means being in an open position at the time the juice is being squeezed out of the fruit as a result of the descent of said upper cup, to permit the juice to flow through said passageway and said strainer means into the juice-receiving container, said valve means being moved to a passage-closed position at a timer subsequent to the squeezing of the fruit by said upper cup, the movement of said valve means to said passage-closed position being substantially contemporaneous with said pulp squeezing means being caused to ascend up through said passageway, in concert with the upward movements of said upper cup, to compress the pulp in said passageway residing adjacent said strainer means, and an orifice of selected size located in a lower part of said passageway, to provide a degree of inhibition to the exiting of seeds through the lowermost part of said passageway, thus to determine the amount of pressure built up in the pulp residing in said passageway during the ascent of said pulp squeezing means.

6. The juice extraction machine as defined in claim 5 in which second power means are utilized for causing a single piece of fruit to be inserted in each lower cup subsequent to the return of said upper bar to its raised position, said second power means taking the form of a device projecting a selected piece of fruit across a distinct air gap and into said lower cup.

7. The juice extraction machine as defined in claim 6 in which said second power means is a pneumatic actuator device having a fruit-contacting means movable between retracted and extended positions, said pneumatic actuator device serving to cause said fruit-contacting means to project the fruit across the air gap after said upper bar and upper cup have returned to their raised positions, and before the next descent of said upper bar away from its raised position.

8. A fruit juice extraction machine for squeezing selected amounts of juice from at least one fruit item, said machine comprising at least one lower fruit receiving cup mounted upon a relatively immovable support means, each lower cup being defined by a series of spaced, upwardly extending fingers and a centrally disposed fruit piercing means, at least one upper cup mounted upon a generally horizontally disposed, vertically movable upper bar, with each upper cup being in vertical alignment with a respective lower cup, each upper cup having a series of spaced, downwardly extending fingers, the fingers of each said upper cup coinciding with the spaces between the fingers of each said lower cup, such that an item of fruit can be squeezed as a consequence of said upper cup descending with its fingers in meshing contact with the fingers of the respective lower cup, power means for causing said vertically movable upper bar to undertake recurring movements between preascertained caused and lowered positions, with said upper cup, when said upper bar is in said raised position, permitting the insertion of an item of fruit into each said lower fruit receiving cup, whereas when each said upper cup has been caused to move into the lowered position, it brings about the squeezing of an item of fruit caused to reside in the respective lower cup, a passageway extending downwardly away from each said lower cup, through which juice, pulp and seeds are caused to flow from the squeezed fruit, and through the lowermost part of which the seeds can finally exit, valve means operatively mounted in an upper portion of said passageway and movable between open and passage-closed positions, strainer means located in a mid part of said passageway, through which only the juice can flow into a surrounding juice-receiving container, pulp squeezing means operatively disposed in a tight fitting manner in a lower part of said passageway, and slidably movable between lowered and raised positions, said valve means being in an open position at the time the juice is being squeezed out of the fruit item as a result of the descent of said upper cup, to permit the juice to flow down through said passageway and said strainer means into the juice-receiving container, said valve means being moved to a passage-closed position at a time subsequent to the squeezing of the fruit item by said cups, the movement of said valve means to said passage-closed position being substantially contemporaneous with said pulp squeezing means being caused to ascend up through said passageway, to compress the pulp residing adjacent said strainer means, and an orifice of selected size located in the lowermost part of said passageway, to provide a degree of inhibition to the exiting of seeds through the lowermost part of said passageway, thus to determine the amount of pressure built up in the pulp residing in said passageway during the ascent of said squeezing means, said orifice being located in an orifice member contained in an orifice retention device, said orifice retention device being readily opened to permit one orifice member to be exchanged for an orifice member having a different effective diameter.

9. A fruit juice extraction machine for squeezing selected amounts of juice from at least one fruit item, said machine comprising at least one lower fruit receiving cup mounted upon a relatively immovable support means, each lower cup being defined by a series of spaced, upwardly extending fingers, and also having a centrally disposed fruit piercing means as well as a passageway for juice, pulp and seeds to move, on occasion, downwardly away form said lower cup, at least one upper cup mounted upon a generally horizontally disposed, vertically movable upper bar, with each upper cup being in careful vertical alignment with a respective lower cup, each upper cap having a series of spaced, downwardly extending fingers, the fingers of each said upper cup coinciding with the spaces between the fingers of each said lower cup, such that an item of fruit can be squeezed as a consequence of said upper cup descending with its fingers in meshing contact with the fingers of the respective lower cup, and a lower bar mounted for vertical movement in a fixed relationship to said upper bar, power means for causing said vertically movable upper and lower bars to undertake recurring movements together between preascertained raised and lowered positions, with said upper cup, when said upper bar is in said raised position, permitting the insertion of an item of fruit into each said lower fruit receiving cup, whereas when each said upper bar has been caused to move into its lowered position, each said upper cup brings about the squeezing of an item of fruit caused to reside in the respective lower cup, and pulp squeezing means for squeezing substantial amounts of juice out of the pulp contained in said passageway, subsequent to the original squeezing of the fruit, latter means being mounted upon said lower bar, and operative to squeeze juice out of the pulp during the ascent of said lower bar, said passageway extending essentially vertically downwardly away from each said lower cup, through which juice, pulp and seeds are caused to flow from the squeezed item of fruit, and through the lowermost part of which the seeds can finally exit, valve means operatively mounted in an upper portion of said passageway and movable between open and passage-closed positions, strainer means located in a midportion of said passageway, through which only the juice can flow into a surrounding juice-receiving container, said pulp squeezing means operatively disposed in a tight fitting manner in a lower part of said passageway, and slidably movable between lowered and raised positions, said valve means being in an open position at the time the juice is being squeezed out of the fruit as a result of the descent of said upper cup, to permit the juice to flow through said passageway and said strainer means into the juice-receiving container, said valve means being moved to a passage-closed position at a time subsequent to the initial squeezing of the item of fruit, when said upper and lower bars are caused to ascend, the movement of said valve means to said passage-closed position being substantially contemporaneous with said pulp squeezing means being caused to ascend up through said passageway, to compress the pulp residing in said passageway adjacent said strainer means, and an orifice of selected size located in the lowermost part of said passageway, to provide a degree of inhibition to the exiting of seeds through the lowermost part of said passageway at the time of ascent of said upper and lower bars, thus to determine the amount of pressure built up in the pulp residing in said passageway during the ascent of said pulp squeezing means, said orifice being part of an orifice member contained in an orifice retention device, said orifice retention device being readily opened to permit one orifice member to be exchanged for an orifice member having a different effective diameter.

10. A fruit juice extraction machine for squeezing selected amounts of juice from at least one fruit item, said machine comprising at least one pair of cups disposed in a vertically aligned relationship, each of said cups being defined by a series of spaced apart fingers, with the lower of each related pair of cups being defined by a series of spaced, upwardly extending fingers and a centrally disposed fruit piercing means, whereas each upper cup is mounted on a vertically movable member that is movable at selected times between preascertained upper and lower positions, and is defined by spaced, downwardly extending fingers whose spacing allows the fingers of said upper cup to mesh with the fingers of the lower cup to bring about the squeezing of the fruit, means for bringing about consistent, up and down movements of said vertically movable member, and power means for causing a single item of fruit to be inserted into each lower cup subsequent to the return of said vertically movable member of its raised position, said power means taking the form of a device having a fruit-contacting portion, operative for projecting a selected item of fruit across a distinct air gap and into said lower cup, said device for projecting the fruit being a pneumatic actuator having an internal piston operatively mounted for movement along substantially the length of said actuator, said piston being connected to a fruit-contacting portion movable between a retracted position and an extended position, and control means for enabling an operator to establish the volume of compressed air to be admitted per stroke behind the piston of said actuator, to cause said fruit-contacting portion to move so as to propel the item of fruit across the air gap and into the lower cup.

11. A fruit juice extraction machine for squeezing selected amounts of juice from at least one fruit item, said machine comprising at least one related pair of cups disposed in a vertically aligned relationship, each of said cups being defined by a series of spaced apart fingers, with the lower of each related pair of cups being defined by a series of spaced part, upwardly extending fingers and a centrally disposed, generally tubular fruit piercing means defining part of a generally vertically disposed passageway, whereas each upper cup is mounted on a vertically movable member that is movable at selected times between preascertained upper and lower positions, and each upper cup is defined by spaced, downwardly extending fingers whose spacing allows the fingers of said upper cup to mesh with the fingers of the lower cup, means for bringing about consistent, up and down movements of said vertically movable member, and power means for causing a single item of fruit to be inserted into each lower cup subsequent to the squeezing of an item of fruit and the raising of said vertically movable member, so that upon the next descent of said one or more upper cups, the newly inserted single item of fruit residing in each lower cup is caused to be squeezed, with the juice, pulp and seeds from such fruit passing downwardly into said passageway, strainer means located in a mid portion of said passageway and leading to a juice receiving container, and vertically movable pulp squeezing means operably disposed in each of said downwardly disposed passageways and being movable up and down in concert with up and down movements of said vertically movable member, such that substantial quantities of juice are squeezed out of the pulp by said pulp squeezing means and caused to enter said strainer means at such time as said vertically movable member is caused to ascend, such being immediately subsequent to the squeezing process in which fruit residing in a lower cup has been squeezed by the related descending upper cup, and a rotary valve located near the top of said passageway, pneumatic means operatively connected with said valve, for rotating said valve between open and passageway-closed positions, said rotary valve being in a passageway-open position during downward movement of said upper cup, but closed upon actuation of said pneumatic means in timed relation with the ascent of said vertically movable member, to aid and assist the pulp squeezing process by closing the top portion of said passageway during the ascent of said pulp squeezing means.

12. The fruit juice extraction machine for squeezing selected amounts of juice from one or more items of fruit as recited in claim 11 in which said power means for inserting the fruit takes the form of a device for projecting a selected item of fruit across a distinct air gap and into the respective lower cup.

13. The fruit juice extraction machine, for squeezing selected amounts of juice from one or more items of fruit as recited in claim 11 in which said vertically movable pulp squeezing means is mounted upon a structural member mechanically connected to said vertically movable member upon which said at least one upper cup is mounted.

14. The fruit juice extraction machine for squeezing selected amounts of juice from one or more items of fruit as recited in claim 11 in which valve means is operably disposed in an upper portion of said passageway, and movable between open and passage-closed positions, said valve means being caused to close at such time as said pulp squeezing means begins its ascent, thus to intensify the pulp squeezing effort.

15. The fruit juice extraction machine for squeezing selected amounts of juice from one or more items of fruit as recited in claim 14 in which an orifice of selected size is located in the lowermost part of said passageway, to provide a degree of inhibition to the exiting of seeds through the lowermost part of said passageway at the time of ascent of said pulp squeezing means, thus to determine the amount of pressure built up in the pulp residing in said passageway during the ascent of said squeezing means.

16. The juice extraction machine as defined in claim 11 in which said power means for causing a single item of fruit to be inserted in each lower cup subsequent to the squeezing of a item of fruit and the raising of said vertically movable member takes the form of a pneumatic actuator having a fruit-contacting means movable between retracted and extended positions, said pneumatic actuator serving to cause said fruit-contacting means to project the fruit across a distinct air gap after said vertically movable member and upper cup have raised, and before the next descent of said vertically movable member.

17. The fruit juice extraction machine for squeezing selected amounts of juice from one or more items of fruit as recited in claim 11 in which a lower bar is mounted for vertical movement in a fixed relationship to said vertically movable member, said pulp squeezing means for squeezing substantial amounts of juice out of the pulp contained in said passageway, subsequent to the original squeezing of the fruit, being mounted upon said lower bar, and operative to squeeze juice out of the pulp during the ascent of said lower bar.

18. A fruit juice extraction machine for squeezing selected amounts of juice from at least one fruit item, said machine comprising at least one related pair of cups disposed in a vertically aligned relationship, each of said cups being defined by a series of spaced apart fingers, with the lower of each related pair of cups being defined by a series of spaced apart, upwardly extending fingers and a centrally disposed, generally tubular fruit piercing means defining part of a generally vertically disposed passageway, whereas each upper cup is mounted on a vertically movable member that is movable at selected times between ascertained upper and lower positions, and each upper cup is defined by spaced, downwardly extending fingers whose spacing allows the fingers of said upper cup to mesh with the fingers of the lower cup, means for bringing about consistent, up and down movements of said vertically movable member, and power means for causing a single item of fruit to be inserted into each lower cup subsequent to the squeezing of a item of fruit and the raising of said vertically movable member, so that upon the next descent of said one or more upper cups, the newly inserted item of fruit residing in each lower cup is caused to be squeezed, with the juice, pulp and seeds from such fruit passing downwardly into said passageway, strainer means located in said mid portion of said passageway and leading to a juice receiving container, and vertically movable pulp squeezing means operably disposed in each of said downwardly disposed passageways and being movable in concert with said vertically movable member, such that substantial quantities of juice are squeezed out of the pulp by said pulp squeezing means and caused to enter said strainer means at such time as said vertically movable member is caused to ascend, such being immediately subsequent to the squeezing process in which fruit residing in a lower cup has been squeezed by the related descending upper cup, valve means operably disposed in an upper portion of said passageway, and movable between open and passage-closed positions, said valve means being caused to close at such time as said pulp squeezing means begins its ascent, thus to intensify the pulp squeezing effort, an orifice of selected size located in the lowermost part of said passageway, to provide a degree of inhibition to the exiting of seeds through the lowermost part of said passageway at the time of ascent of said pulp squeezing means, thus to determine the amount of pressure built up in the pulp residing in said passageway during the ascent of said squeezing means, said orifice of selected size being part of an orifice member, and an easily opened orifice member retention means enabling an orifice member having one orifice size to be readily exchanged for an orifice member having a different orifice size.

19. A fruit juice extraction machine for squeezing selected amounts of juice from at least one fruit item, machine comprising at least one pair of cups disposed in a vertically aligned relationship, each of said cups being defined by a series of spaced apart fingers, with the lower of each related pair of cups being defined by a series of spaced, upwardly extending fingers and a centrally disposed fruit piercing means, each upper cup being mounted on a vertically movable upper member that is movable at selected times between pres ascertained upper and lower positions, said upper member being directly connected to a vertically movable lower member, to move at all times therewith, the fingers of each said upper cup coinciding with the spaces between the fingers of the respective lower cup, such that an item of fruit received in said lower cup can be squeezed as a consequence of the upper cup descending with its fingers in meshing contact with the fingers of the related lower cup, power means for causing said vertically movable upper and lower members to undertake recurring movements between the preascertained upper and lower positions, with said upper cup, when said vertically movable member is in said upper position, permitting the insertion of an item of fruit into each said lower fruit receiving cup, and when each said upper cup has been caused to move into the lowered position, it brings about the squeezing of the item of fruit caused to reside in the respective lower cup, and a passageway extending downwardly away from each said lower cup, through which juice, pulp and seeds are caused to flow from the squeezed fruit item as a result of the descent of said upper cup, and through the lowermost part of which the seeds can finally exit, valve means operatively mounted in an upper portion of said passageway and movable between open and passage-closed positions, strainer means located in a mid part of said passageway, through which only the juice can flow into a surrounding juice,-receiving container, pulp squeezing means operatively disposed in a tight fitting manner in a lower part of said passageway, and mounted in fixed relationship to said vertically movable lower member, so as to be slidably movable therewith between lowered and raised positions, said valve means being in an open position at the time the juice is being squeezed out of the fruit as a result of the descent of said upper cup, to permit the juice to flow through said passageway and said strainer means into the juice-receiving container, said valve means being moved to a passage-closed position at a time subsequent to the squeezing of the fruit item by said upper cup, the movement of said valve means to said passage-closed position being substantially contemporaneous with said pulp squeezing means being caused to ascend up through said passageway, to compress the pulp in said passageway residing adjacent said strainer means, and an orifice of selected size located in a lower part of said passageway, to provide a degree of inhibition to the exiting of seeds through the lowermost part of said passageway, thus to determine the amount of pressure built up in the pulp residing in said passageway during the ascent of said pulp squeezing means.

20. A fruit juice extraction machine for squeezing selected amounts of juice from at least one fruit item, said machine comprising at least one pair of cups disposed in a vertically aligned relationship, each of said cups being defined by a series of spaced apart fingers, with the lower of each related pair of cups being defined by a series of spaced, upwardly extending fingers and a centrally disposed fruit piercing means, whereas each upper cup is mounted on a vertically movable member that is movable at selected times between preascertained upper and lower positions, and is defined by spaced, downwardly extending fingers whose spacing allows the fingers of said upper cup to mesh with the fingers of the associated lower cup to bring about the squeezing of the fruit, means for bringing about consistent, up and down movements of said vertically movable member, and a bi-directional pneumatic actuator for causing a single item of fruit to be projected at a time across a distinct air gap and into the adjacent lower cup during the return of said vertically movable member to its raised position, said actuator having a front end and a rear end and having a fruit-contacting portion at its front end, operative for projecting a selected item of fruit across the distinct air gap and into said lower cup, said actuator having a piston operatively disposed in its interior, with a pneumatic connector provided at each end of said actuator, and a respective control line for alternately and selectively providing compressed air from a source of compressed air to the connector provided at each end of said actuator, to cause a timed reciprocating movement of said piston along the interior of said actuator, said piston being connected by a rod to said fruit-contacting portion disposed at the front end of said actuator, said fruit-contacting portion being movable between a retracted, fruit-receiving position, and an extended position as a consequence of movement of said piston, control means disposed in the control line connected to the pneumatic connector provided at the rear end of said actuator, for enabling the operator to determine for fruit of a given weight, the volume of compressed air to be admitted per stroke behind the piston of said actuator, for causing said fruit-contacting portion to move so as to reliably propel each successive item of fruit across the air gap and into said lower cup.

* * * * *